US012687220B2

(12) United States Patent
Wijntjes et al.

(10) Patent No.: US 12,687,220 B2
(45) Date of Patent: Jul. 21, 2026

(54) ADJUSTING DRIVE FOR AN EXTERIOR VISION ELEMENT FOR A MOTOR VEHICLE COMPRISING FIRST AND SECOND ELECTRIC MOTORS

(71) Applicant: MCi (Mirror Controls International) Netherlands B.V., Woerden (NL)

(72) Inventors: Jannick Daniël Wijntjes, Rotterdam (NL); Stefan Fritz Brouwer, Schoonhoven (NL); Paulus Gerardus Maria Van Stiphout, Woerden (NL); Hendrik Alfred Simeon De Vries, Schoonhoven (NL); François Roderik Henri Bouaziz, Rotterdam (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 283 days.

(21) Appl. No.: 18/285,200

(22) PCT Filed: Apr. 1, 2022

(86) PCT No.: PCT/NL2022/050185
§ 371 (c)(1),
(2) Date: Sep. 29, 2023

(87) PCT Pub. No.: WO2022/211636
PCT Pub. Date: Oct. 6, 2022

(65) Prior Publication Data
US 2024/0183436 A1     Jun. 6, 2024

(30) Foreign Application Priority Data
Apr. 1, 2021     (NL) ...................................... 2027910

(51) Int. Cl.
F16H 37/06 (2006.01)
B60R 1/07 (2006.01)
(Continued)

(52) U.S. Cl.
CPC ......... F16H 37/065 (2013.01); F16H 57/039 (2013.01); B60R 1/07 (2013.01);
(Continued)

(58) Field of Classification Search
CPC . B60R 1/07; F16H 2057/02082; F16H 3/002; F16H 3/085; F16H 19/08; F16H 37/04; F16H 57/10
See application file for complete search history.

(56) References Cited

U.S. PATENT DOCUMENTS 3,609,014 A     9/1971   Kurz, Jr.
3,972,597 A     8/1976   Repay et al.
(Continued)

FOREIGN PATENT DOCUMENTS

CN          102705502 A     10/2012
CN          207059745 U  *   3/2018
(Continued)

*Primary Examiner* — Paul C Lee
(74) *Attorney, Agent, or Firm* — Volpe Koenig

(57) ABSTRACT

Provided is a drive, in particular for an adjusting instrument for an exterior vision element for a motor vehicle, comprising a driving mechanism cooperating with a first electric motor. The driving mechanism is configured for, by energization of the first electric motor, driving respectively a first and a second element to be driven. The driving mechanism comprises a coupling mechanism cooperating with a second electric motor. The coupling mechanism is configured for, by energization of the second electric motor, selectively coupling the driving mechanism with respectively the first and the second element to be driven.

17 Claims, 11 Drawing Sheets

(51) Int. Cl.
  F16H 57/02          (2012.01)
  F16H 57/039         (2012.01)
(52) U.S. Cl.
  CPC .............. *F16H 2057/02034* (2013.01); *F16H 2057/02082* (2013.01)

(56)                    References Cited

U.S. PATENT DOCUMENTS

| | | | |
|---|---|---|---|
| 4,202,603 A | 5/1980 | Miyauchi | |
| 2011/0261476 A1 | 10/2011 | Van Stiphout | |
| 2021/0291646 A1* | 9/2021 | Lorenz ................... | B60K 23/04 |

FOREIGN PATENT DOCUMENTS

| | | | | |
|---|---|---|---|---|
| JP | S52-118887 A | 10/1977 | | |
| JP | H04-303039 A | 10/1992 | | |
| KR | 20080053929 A | 6/2008 | | |
| KR | 101122409 B1 * | 3/2012 | ............ | F16H 63/30 |
| KR | 20190100055 A | 8/2019 | | |

* cited by examiner

ADJUSTING DRIVE FOR AN EXTERIOR VISION ELEMENT FOR A MOTOR VEHICLE COMPRISING FIRST AND SECOND ELECTRIC MOTORS

CROSS REFERENCE TO RELATED APPLICATIONS

This application is a § 371 National Stage application of International Application No. PCT/NL2022/050185, filed Apr. 1, 2022, entitled "ADJUSTING DRIVE FOR AN EXTERIOR VISION ELEMENT FOR A MOTOR VEHICLE", and claims priority to Netherlands Patent Application No. 2027910, filed Apr. 1, 2021, which are incorporated by reference as if fully set forth.

BACKGROUND

An adjusting instrument for an exterior vision element of a motor vehicle usually comprises a carrier which carries an exterior vision unit, such as an exterior mirror, camera, LIDAR and/or display. The carrier can then be part of the housing of the exterior vision unit, or form a separate part thereof. The carrier is usually adjustable via a drive, in particular an electrical drive, with respect to a base of the adjusting instrument, to be mounted on the motor vehicle, and is then adjustable or not with respect to the housing of the exterior vision unit.

The adjusting instrument is often intended to adjust the vision unit about multiple adjustment axes, in particular both about an axis of standing orientation with respect to the fixed world and about an axis of lying orientation with respect to the fixed world. For instance, when the exterior vision unit is in a drive position, the angle at which a driver can look via the exterior vision element can be set. Adjustment about the standing axis can then usually be done in two directions, i.e., both from left to right and from right to left. Adjustment about the lying axis can then usually be done likewise in two directions, i.e., both from bottom to top and from top to bottom. When a conventional exterior mirror is involved, in practice, in the context of this adjustment, often the term mirror glass actuation is used.

Also, the adjusting instrument may be intended to adjust the vision unit between a park position, in which the carrier extends substantially along the vehicle, and a folded-out drive position, in which the carrier extends substantially transverse to the vehicle. Such an adjustment is usually referred to by the term power fold actuation.

In a number of instances, the adjusting instrument may be provided with one actuator having two drives each provided with its own electric motor, with which both the pivoting movement by which the carrier is folded in and out is carried out, and the adjusting movement by which the carrier is adjusted about the standing and/or lying axis is carried out. The exterior vision unit can then be regarded as a two-axis power fold actuator, or as a mirror glass actuator with power fold function. In such an adjusting instrument with single actuator, the pivoting axis can then coincide with the standing adjustment axis. Such an adjusting instrument is described in EP 3218226.

While this adjusting element has a great many advantages, it also has disadvantages. For instance, the instrument includes a relatively heavy spring energization to keep it in the proper position after adjustment about the standing and lying axes. As a consequence, not only the electric motor for adjustment about the standing axis needs to be of relatively heavy design, but also the electric motor for adjustment about the lying axis. This increases costs. Also, this may lead to problems in that the door module which takes care of the power supply for the adjusting instrument, for the purposes of power folding and mirror glass actuation, is often configured by standard design to supply and switch current for just one electric motor of relatively heavy design, and is further configured mainly to supply and switch relatively light electric currents. Providing an adapted door module which, for adjustment of the vision unit about the standing and lying axes, can supply and switch two relatively heavy electrical currents is relatively costly.

SUMMARY OF THE INVENTION

The invention contemplates a drive for an adjusting instrument with which, while preserving the advantages mentioned, the disadvantages mentioned can be counteracted. To this end, the invention provides a drive, in particular for an adjusting instrument for an exterior vision element for a motor vehicle, comprising a driving mechanism cooperating with a first electric motor, the driving mechanism being configured for, by energization of the first electric motor, driving respectively a first and a second element to be driven, which driving mechanism comprises a coupling mechanism cooperating with a second electric motor, the coupling mechanism being configured for, by energization of the second electric motor, selectively coupling the driving mechanism with respectively the first and the second element to be driven. By providing the drive with an electrically operated coupling mechanism, it can suffice with one relatively heavy first electric motor to operate elements to be selectively driven for adjustment about the standing axis and the lying axis, respectively, and with one relatively light electric motor to operate the coupling mechanism. Thus, costs can be saved on the electric motors, and use can be made of a standard door module.

The electric motors can be implemented as low-voltage electric motors, as are usual in the electric onboard network of a motor vehicle, in particular low-voltage direct-current electric motors. Low-voltage within this context should at least be understood to mean that the electric motors are motors designed for working voltage of less than approximately 100V or even less than approximately 50V, in particular approximately 24V or approximately 12V. The first and/or second electric motors may be implemented as conventional DC electric motors, brushless DC electric motors, stepping motors or alternating current motors.

The maximum absorbed power of the second electric motor can, according to the invention, be less than that of the first electric motor. The absorbed power of the second, relatively light electric motor can for instance be less than half or less than a quarter of the absorbed power of the relatively heavy, first electric motor, and is elegantly about 10% of the absorbed power of the relatively heavy, first electric motor. The absorbed power of the first electric motor can be less than 25 W, for instance about 12 W, and absorbed power of the second electric motor can be less than 2.5 W, for instance approximately 1 W. Advantageously, both motors are configured for equal working current.

The electrical supply of both the first and the second electric motor can be taken care of by one electric door module of a motor vehicle. The electric door module then switches the power supply for both first and second electric motor, but only the switched power supply of the first electric motor is of relatively heavy-duty design, e.g., for max 25 W versus max 2.5 W for the second electric motor.

The coupling mechanism can be adjustable under action of the second electric motor between a first condition in which the first motor is coupled with the first element to be driven, and a second condition in which the first motor is coupled with the second element to be driven. The coupling mechanism can then in the first condition leave free the second element to be driven and in the second condition leave free the first element to be driven. The coupling mechanism may then under the action of the second electric motor be adjustable into a neutral condition, in which the coupling leaves free both the first and the second element to be driven. What can thus be achieved is that the relatively heavy electric motor in each case is coupled with at best one of the first and the second element to be driven, while leaving free the other element to be driven. In the neutral condition, both elements to be driven can be free. When the elements to be driven are free, it can be achieved that these can move without their needing to carry the first electric motor along, and, for instance, assemblage can be made easier. Elegantly, the neutral condition is then an intermediate condition in-between the first and second condition.

The coupling mechanism can be configured to counteract driving of the second motor by the first motor. By thus implementing the coupling mechanism to be self-braking in the direction of the second electric motor, it can be counteracted that a force component split off from the driving force exerted by the first electric motor, that is exerted on the coupling mechanism opposes, or cancels, the operating force of the relatively light second electric motor.

The driving mechanism can comprise a driving stage cooperating with the first electric motor, which driving stage cooperates with a first output stage which the first element to be driven is part of, and with a second output stage which the second element to be driven is part of. Thus, in the driving stage and/or output stages, e.g. additional transmissions can be realized, for instance reduction of the speed.

The driving stage can comprise an output element which under action of the second electric motor with the aid of the coupling mechanism is adjustable between a first position, corresponding to the first condition of the coupling mechanism, in which the output element of the driving stage cooperates with the first output stage, and a second position, corresponding to the second condition of the coupling mechanism, in which the output element of the driving stage cooperates with the second output stage. Thus the coupling mechanism can be arranged to adjust the output element by means of displacement, for instance pivoting and/or sliding, between the first and the second position. The output element of the driving stage can then in the first position leave free the second element to be driven, in particular the second output stage, and in the second position leave free the first element to be driven, in particular the first output stage. The output element can then under action of the second electric motor with the aid of the coupling mechanism be adjustable into a neutral position, corresponding to the neutral condition of the coupling mechanism, in which the output element leaves free both the first and the second element to be driven, and in particular both the first and the second output stage.

The coupling mechanism can comprise a pivotably disposed lever arm which is pivoted by the second electric motor, and which at one end comprises an output element of the driving stage. The one end of the lever arm may for instance comprise a gearwheel segment which is coupled with a gearwheel driven via the second electric motor. Alternatively, for instance, a slot may be used which cooperates with a cam or an eccentric.

The first and second electric motors can be disposed movably relative to each other, for instance in that the first or the second electric motor moves along with the lever arm. The first and second electric motors can also be disposed fixedly relative to each other, for instance when the central axis of the motor shaft of the first electric motor coincides with a pivoting axis of the lever arm.

The driving output element and the element to be driven can for instance be executed as a set of cooperating gearwheels with straight toothing, but can also for instance comprise a cooperating worm wheel/worm gearwheel pair or gearwheel/crown wheel pair.

The coupling mechanism may also comprise a translatably disposed arm, in particular two arms disposed movably relative to each other in opposite direction. With such an arm, for instance a slide coupling can be operated, with which a component part of the drive is or is not brought into engagement, or with which a component part of the drive is or is not released.

The coupling mechanism can also comprise a planetary gear transmission, for instance a planetary gear transmission with a double output, of which in each case one can be fixed, so that the other output can form the driving output element.

The invention also concerns an adjusting instrument for an exterior vision element for a motor vehicle, which includes a drive in one of the variants as described hereinbefore, a first output stage for driving an upward and downward pivoting movement of an exterior vision element, and a second output stage for driving an inward and outward pivoting movement of an exterior vision element. The adjusting element may also be already provided with an exterior vision unit coupled with the first and/or second element to be driven, such as a mirror glass, LIDAR sensor or camera. The exterior vision unit may then be coupled with the output stages directly, but also indirectly, for instance via a carrier. The exterior vision unit and/or the carrier may then, via a hinge mechanism, be hingedly connected with a base to be mounted for instance on the door of the motor vehicle, and under the influence of the adjusting drive be adjustable relative to the base.

The adjusting drive may be executed with first and/or second output stages which in a neutral condition of the coupling mechanism are not self-braking. Thus, when the coupling mechanism leaves free the element to be driven of the output stage concerned, the exterior vision element can upon exertion of external forces up to a limiting value remain in position, and upon exertion of external forces exceeding that limiting value be adjusted in position without the first electric motor being driven and/or damaging the output stage. The exterior vision element can then, when the coupling mechanism is in the neutral condition, be held in position with the aid of friction in the adjusting device, for instance up to the limiting value of an externally exerted force.

Further advantageous embodiments are represented in the dependent claims.

It will be clear that each of the above aspects is optional, that the aspects can be mutually combined, and that elements of the above aspects can be isolated from their context and be used independently or in combination with only some of the aspects described.

BRIEF DESCRIPTION OF THE DRAWINGS

The invention will be further explained on the basis of an exemplary embodiment of an adjusting instrument which is shown in the drawings. In the drawings:

FIG. 1 shows an example of an exterior vision element with adjusting element such as this is known in the prior art;

FIG. 9 an example of the coupling mechanism according to the description;

Figure 2:
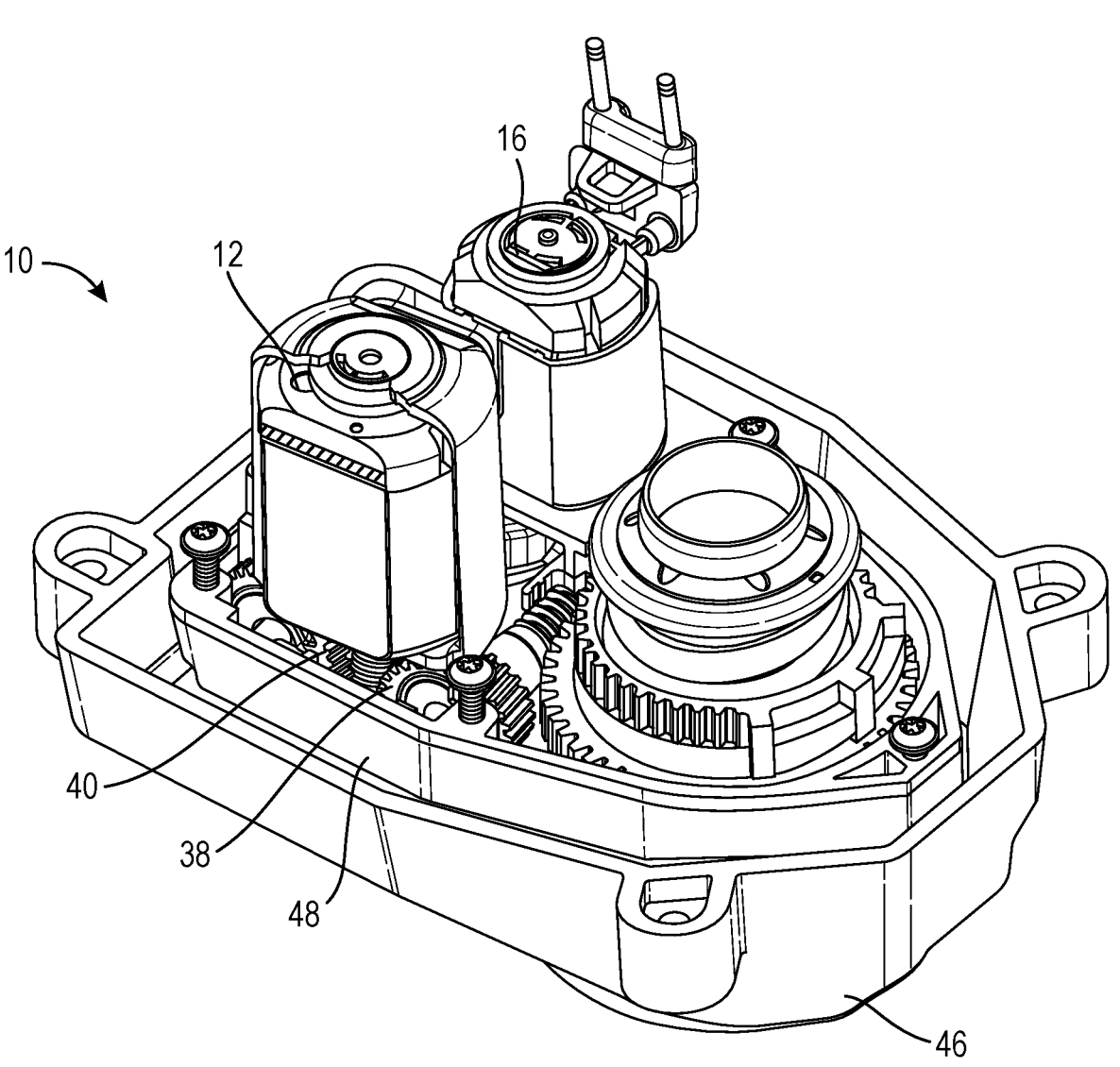
FIG. 2 shows an example of the drive and the adjusting instrument according to the description.

The drawings are only shown by way of exemplary embodiment and should not in any way be regarded as limiting.

DETAILED DESCRIPTION OF THE FIGURES

In the following detailed description of the figures, with the aid of reference numerals reference is made to the examples which are represented in the figures.

Figure 1:
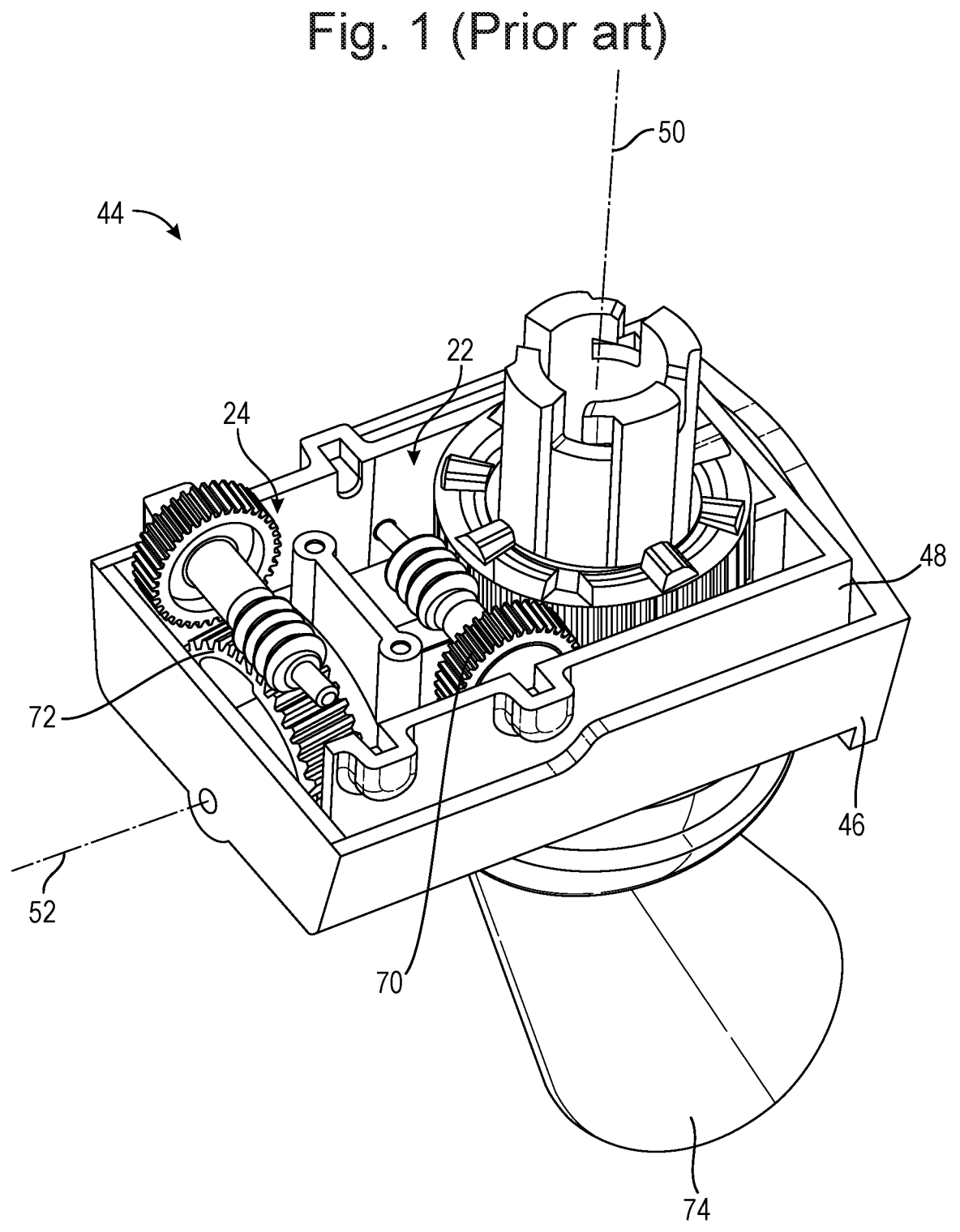

In all embodiments the adjusting instrument 10 can be part of an exterior vision element 44 such as the example shown in FIG. 1, which is already known from the prior art. The exterior vision element 44 comprises a base 74 of the adjusting instrument 10, which is to be mounted on the motor vehicle, and a carrier 46 which can be rotated by the adjusting instrument relative to the base 74 around a first hinging axis 50 and a second hinging axis 52. The exterior vision element 44 may comprise, as shown in FIG. 1, a carrying frame 48 which is rotatable around the first hinging axis 50 relative to the base 74, with the carrier 46 being rotatable around the second hinging axis 52 relative to the carrying frame 48. The carrier 46 can comprise a cap which covers-over the adjusting element and to which the exterior vision unit, such as an exterior mirror, camera, LIDAR and/or display, can be attached. The operation of the hinges which enable the rotation of the carrier 46 relative to the base 74 is for instance equal to that of the described hinges of the embodiment as described on page 6, line 14 to page 10, line 7 of WO 2016/076713. The driving of the first element to be driven 70 can result in pivoting of the carrier 46 around the first hinging axis 50, and the driving of the second element to be driven 72 can result in pivoting of the carrier 46 around the second hinging axis 52. In this manner, an exterior vision unit associated with the carrier can be adjusted.

Most generally, the invention provides a drive, in particular for an adjusting instrument 10 for an exterior vision element for a motor vehicle. The drive comprises a driving mechanism 14 cooperating with a first electric motor 12, which driving mechanism 14 is configured for, by energization of the first electric motor 12, driving respectively a first and a second element to be driven 70, 72. The driving mechanism 14 comprises a coupling mechanism 18 cooperating with a second electric motor 16, which coupling mechanism 18 is configured for, by energization of the second electric motor 16, selectively coupling the driving mechanism 14 with respectively the first and the second element to be driven 70, 72. The effects and advantages of the drive have already been described in the summary and these effects and advantages are understood to be inserted here by reference.

Figure 3:
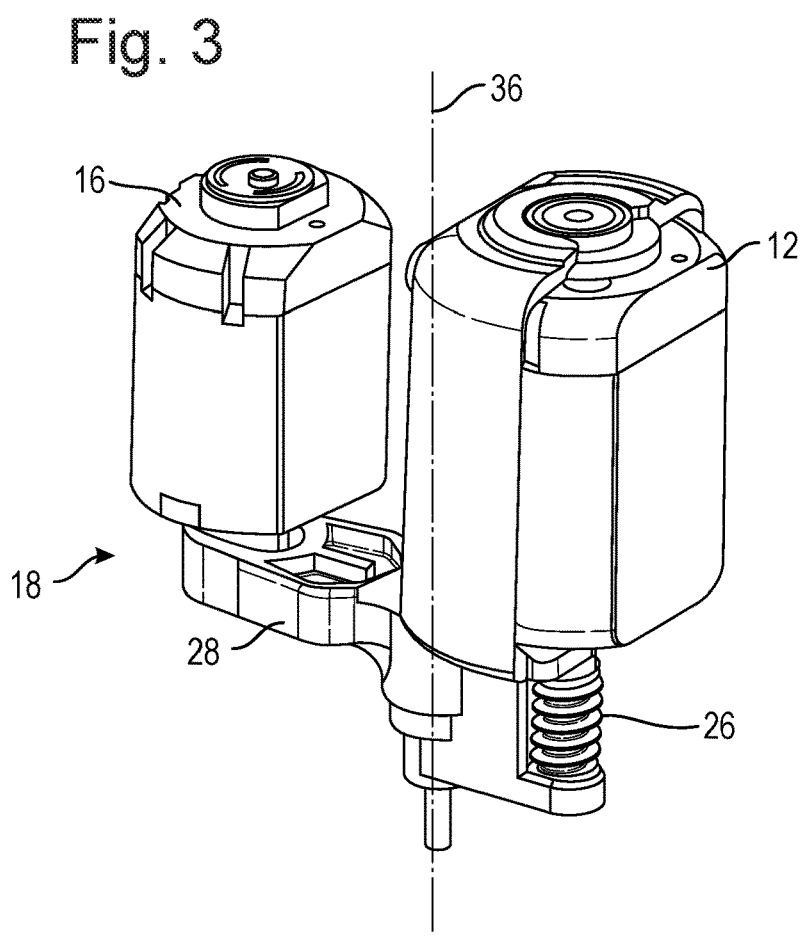
FIG. 3 shows a detail of the example of FIG. 2.
Figure 4:
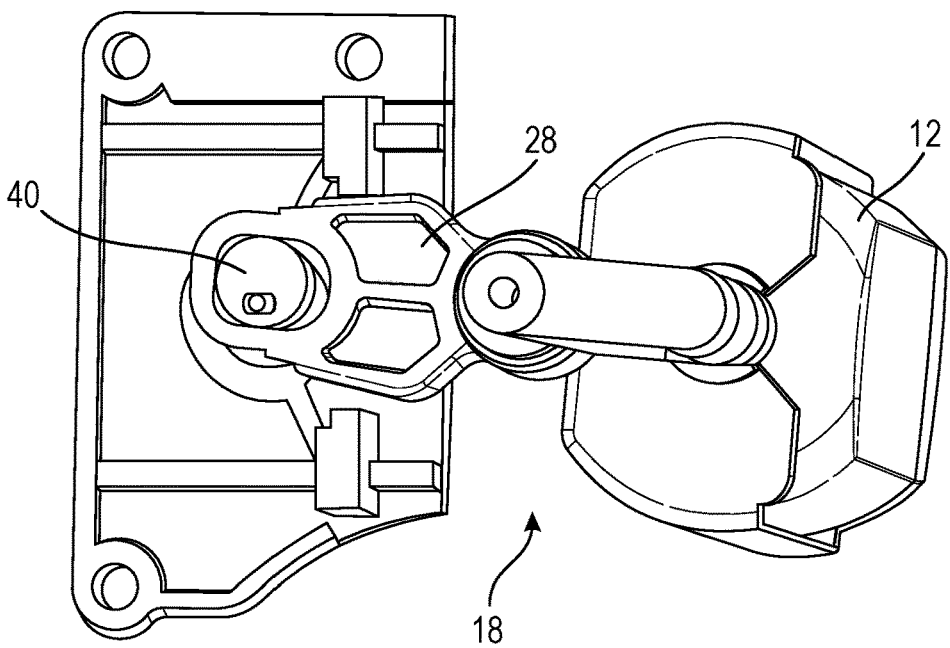
FIG. 4 shows an underside of the example of FIG. 2.

In a first embodiment, as shown in FIGS. 2-4, the coupling mechanism 18 comprises a lever arm 28 pivotable around a pivoting axis 36. The first electric motor 12 is placed on or at a first end of the lever arm 28. The output element 26 is a worm driven by the first electric motor 12. A second end of the lever arm 28 is connected with the second electric motor 16 and can be pivoted by it. By the pivoting of the second end of the lever arm 28 by the second electric motor 16, also the first electric motor and the worm 26 are pivoted. The worm 26, in this way, can be selectively coupled to the first and the second element to be driven 70, 72. By this pivoting, the worm 26 can for instance engage a worm gear 38 of the first output stage 22, as a result of which the first element to be driven 70 is driven. Also, the worm 26 can engage a worm gear 40 of the second output stage 24, as a result of which the second element to be driven 72 is driven.

The angle through which the lever arm 28 can be pivoted may be executed such that the worm 26 has a neutral position where the worm 26 is free of the first output stage 22 and is free of the second output stage 24. In the example of FIG. 4, the second electric motor 12 is connected with the lever arm 28 by means of a wheel 42 which is eccentrically connected with a rotor of the second electric motor 16. The eccentric wheel 40 may be received between two arms at the second end of the lever arm 28. By adjusting the rotary position of the rotor of the motor 16, the lever arm 28 is pivoted by the eccentric wheel 42.

Figure 5:
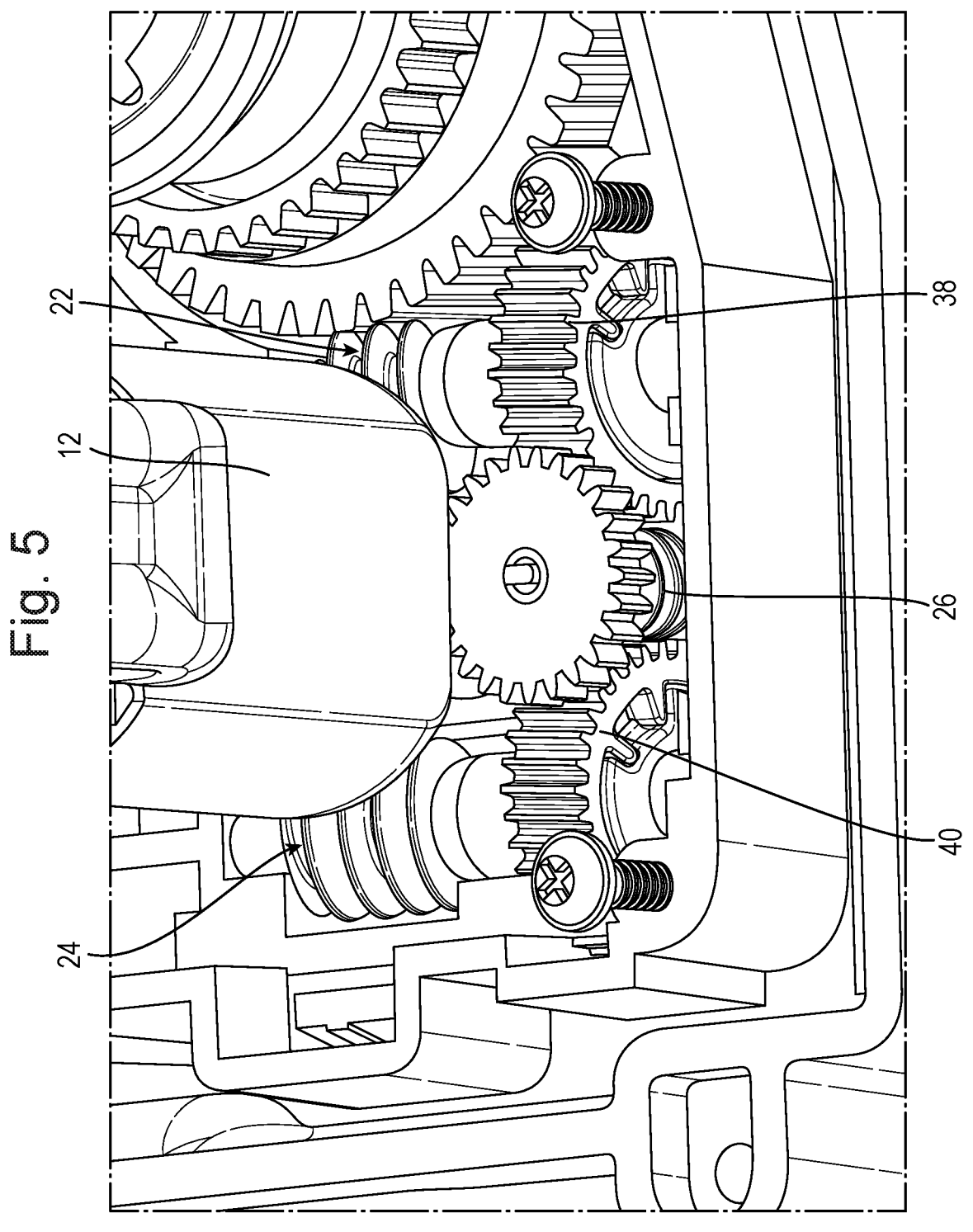
FIG. 5 shows another example of the drive and the adjusting instrument according to the description.
Figure 6:
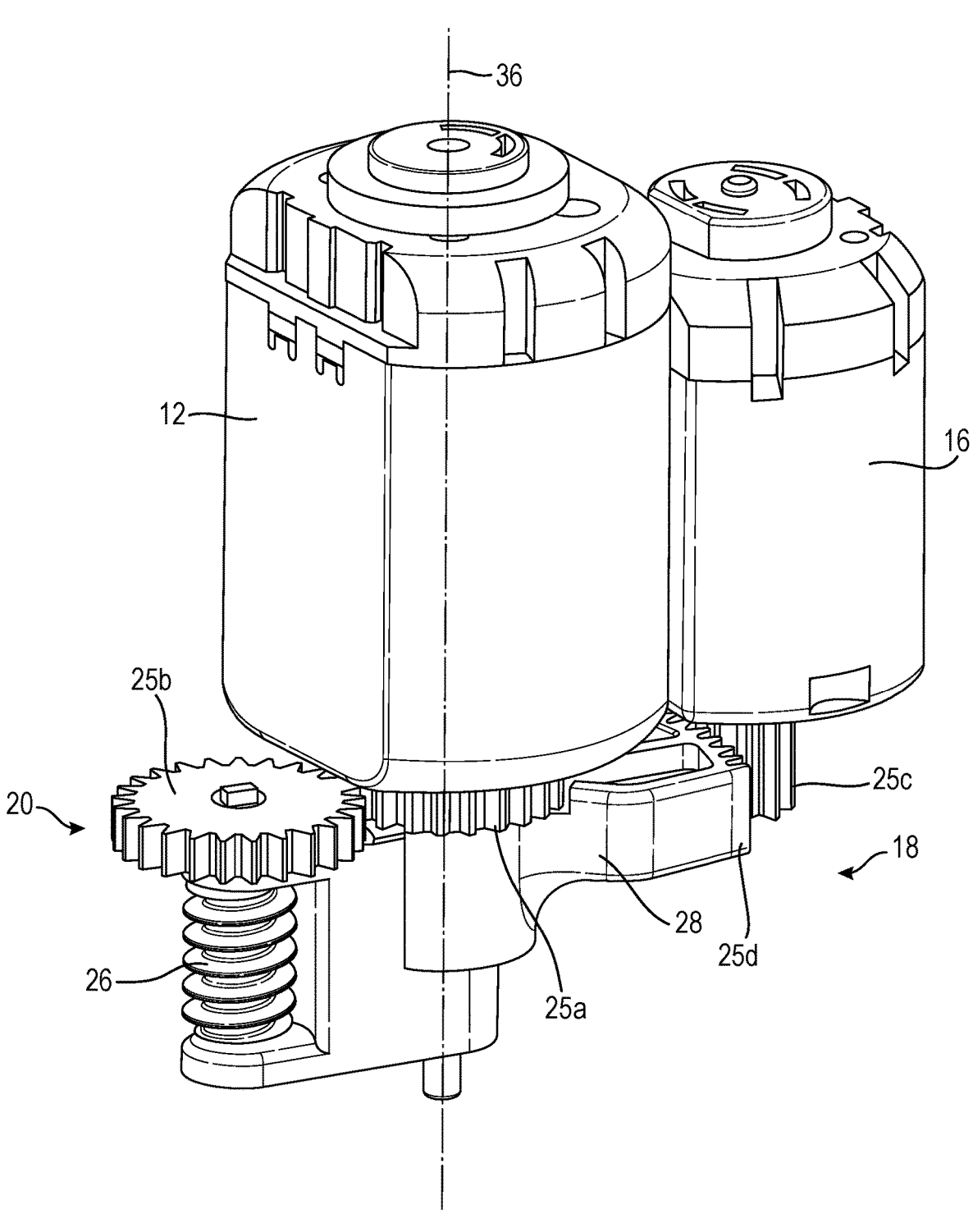
FIG. 6 shows a detail of the example of FIG. 5.

The FIGS. 5 and 6 show an example of a second embodiment, which is comparable to the above-described embodiment. Instead of the first electric motor 12 being placed at an end of the lever arm 28, the motor 12 is placed concentrically with the pivoting axis 36. This is to say that a central axis of a rotor of the first electric motor 12 coincides with the pivoting axis 36. The first motor 12 can then be fixedly mounted within the adjusting instrument 10. This has as an advantage that no flexible electrical connections are needed for the first motor. By means of a driving stage 20, the first electric motor can drive the output element 26. The driving stage 20, an example of which is shown in FIG. 6, can consist of a first motor gearwheel 25a which is connected with the rotor of the first electric motor, and an output gear 25b which is connected with the output element 26.

The output element 26, just as in the first embodiment, can be a worm driven by the first electric motor 12, which worm, using the coupling mechanism 18, is selectively couplable to the first or the second element to be driven 70, 72.

In the example of FIG. 5, the second electric motor 16 is connected with the lever arm 28 by means of a second motor gearwheel 25c which is connected to the rotor of the second electric motor 16. The gearwheel 25c engages a toothed end or gearwheel segment 25d of the lever arm 28 and by turning can cause the lever arm 28 to rotate. The second electric motor 16 can also be connected to the lever arm 28, with the second motor gearwheel 25c engaging a gearwheel segment 25d fixedly connected with the frame 46.

Figure 7:
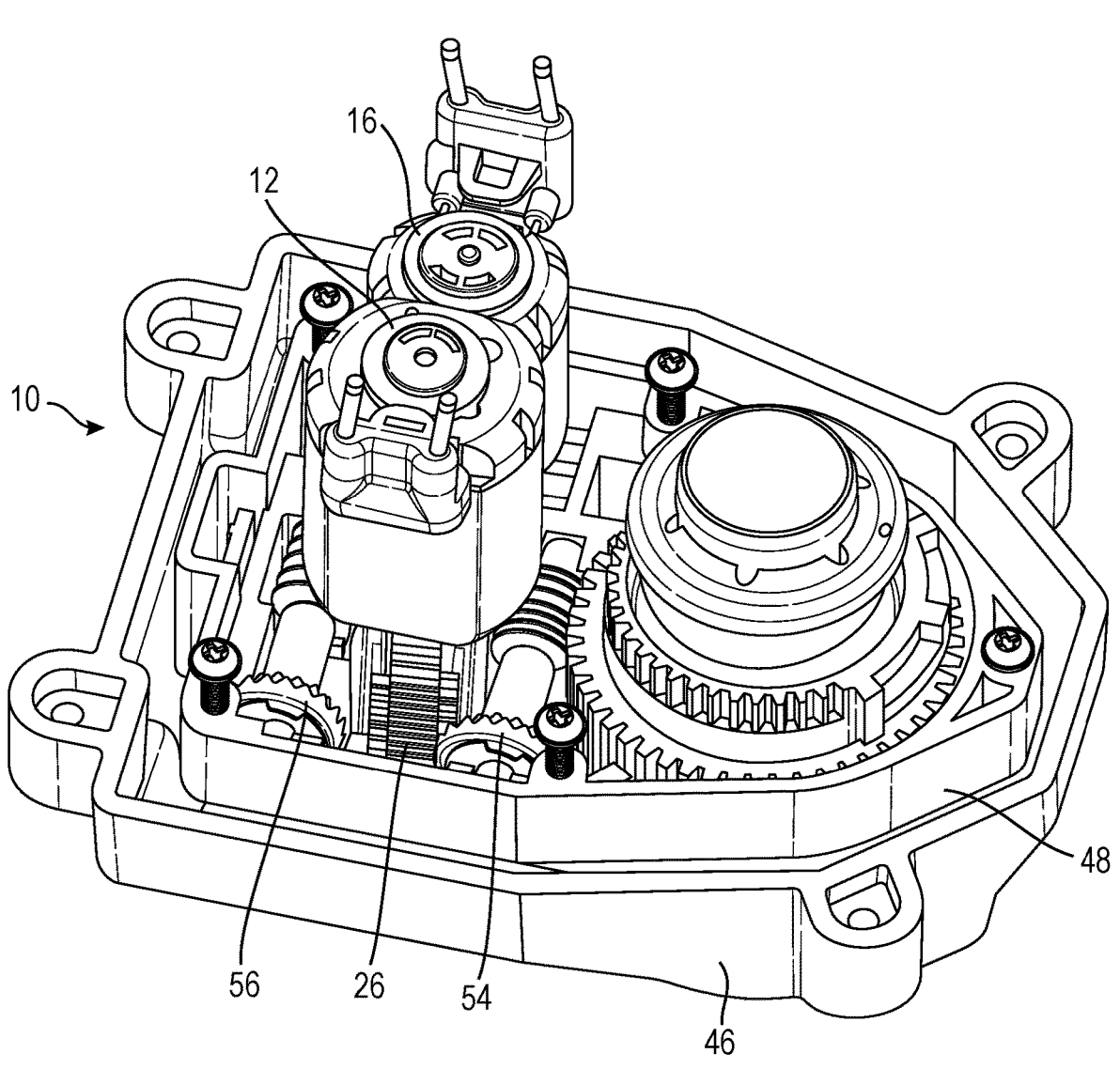
FIG. 7 shows another example of the drive and the adjusting instrument according to the description.
Figure 8:
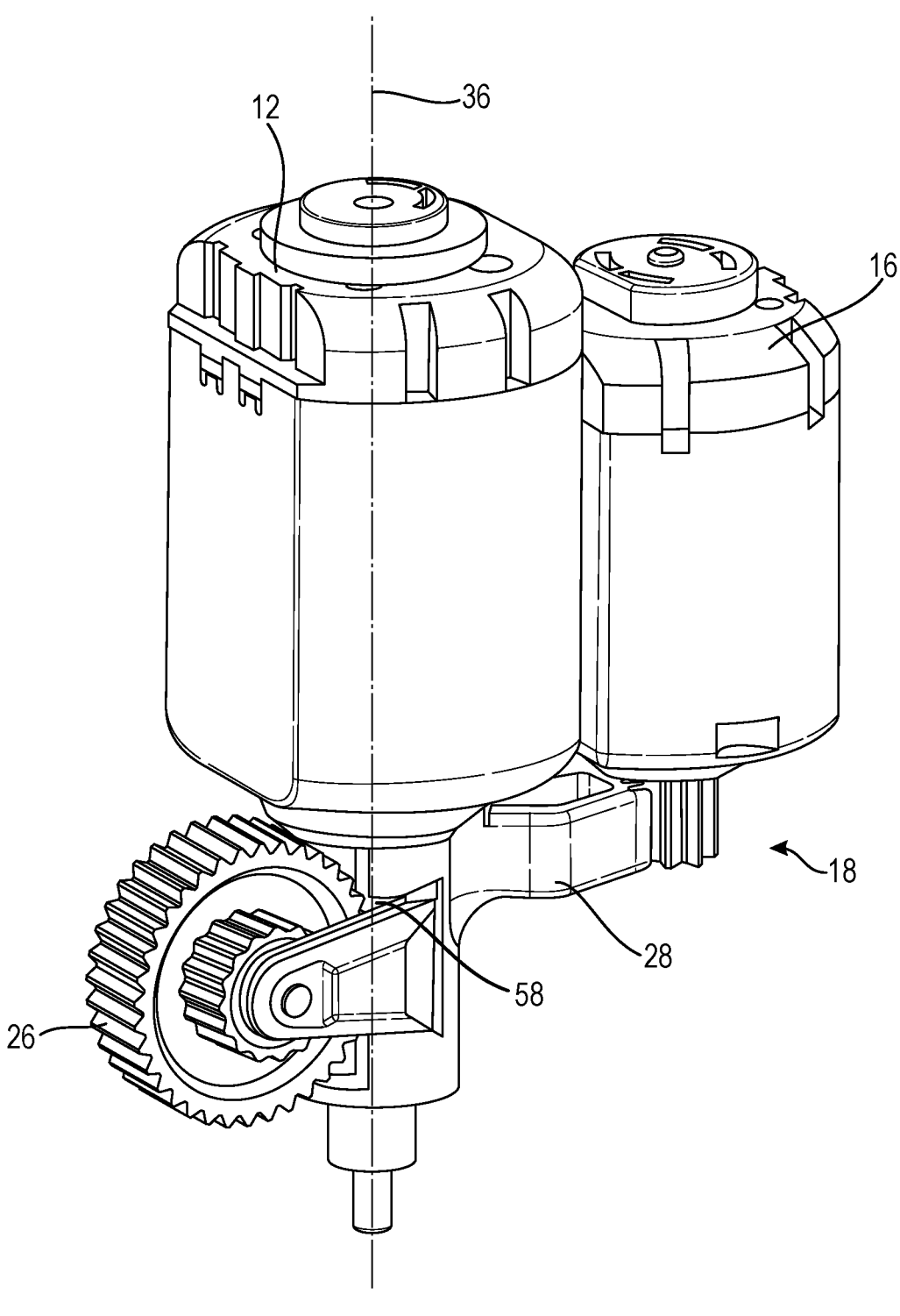
FIG. 8 shows a detail of the example of FIG. 7.

In a third embodiment, an example of which is shown in the FIGS. 7 and 8, the output element 26 can be a gearwheel 25b with straight toothing. It can be an ordinary gearwheel, or a compound gearwheel 26, as shown in the Figures, with a central part and two side parts, with the side parts having a smaller diameter than the central part. A first side part of the gearwheel 26 can, by pivoting of the lever arm 28, be coupled with the first element to be driven 70. This can for instance be done by the gearwheel engaging a first crown gearwheel 54 of the first output stage 22. A second side part of the gearwheel 26 can, by pivoting of the lever arm 28, be coupled to the second element to be driven 72. This can for instance be done by the gearwheel 26 engaging the second crown gearwheel 56 of the second output stage 24. By the use of the compound gearwheel 26, the transmission from the first electric motor 12 to the first or second element to be driven 70, 72 is slowed, for instance to arrive at a desired adjusting speed of the exterior vision element. By giving the different side parts a different diameter, this delay can be defined per element to be driven 70, 72. The gearwheel 26 can be driven by a driving worm 58 which is connected to the rotor of the first electric motor 12.

Figure 9:
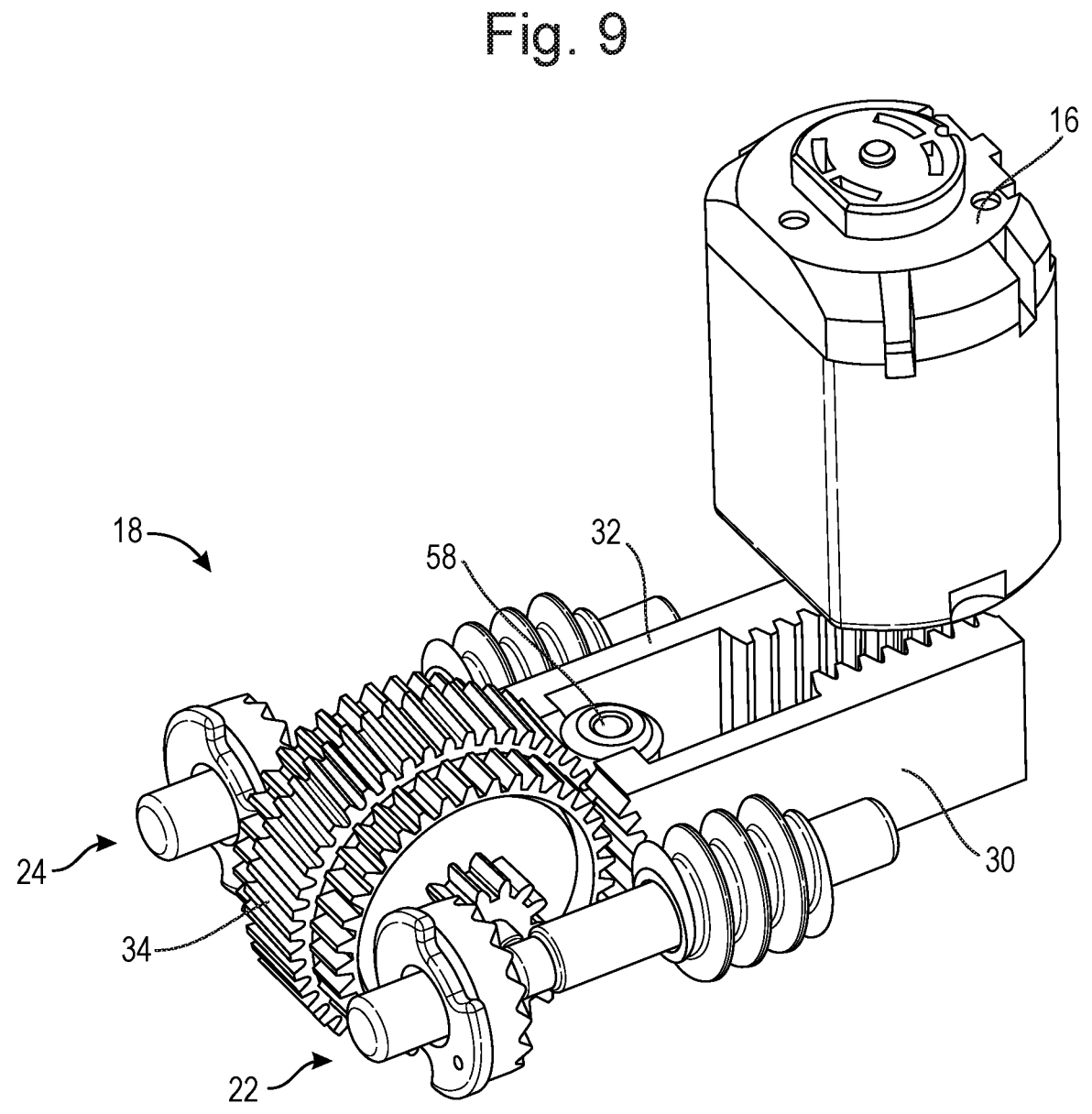
Figure 9B:
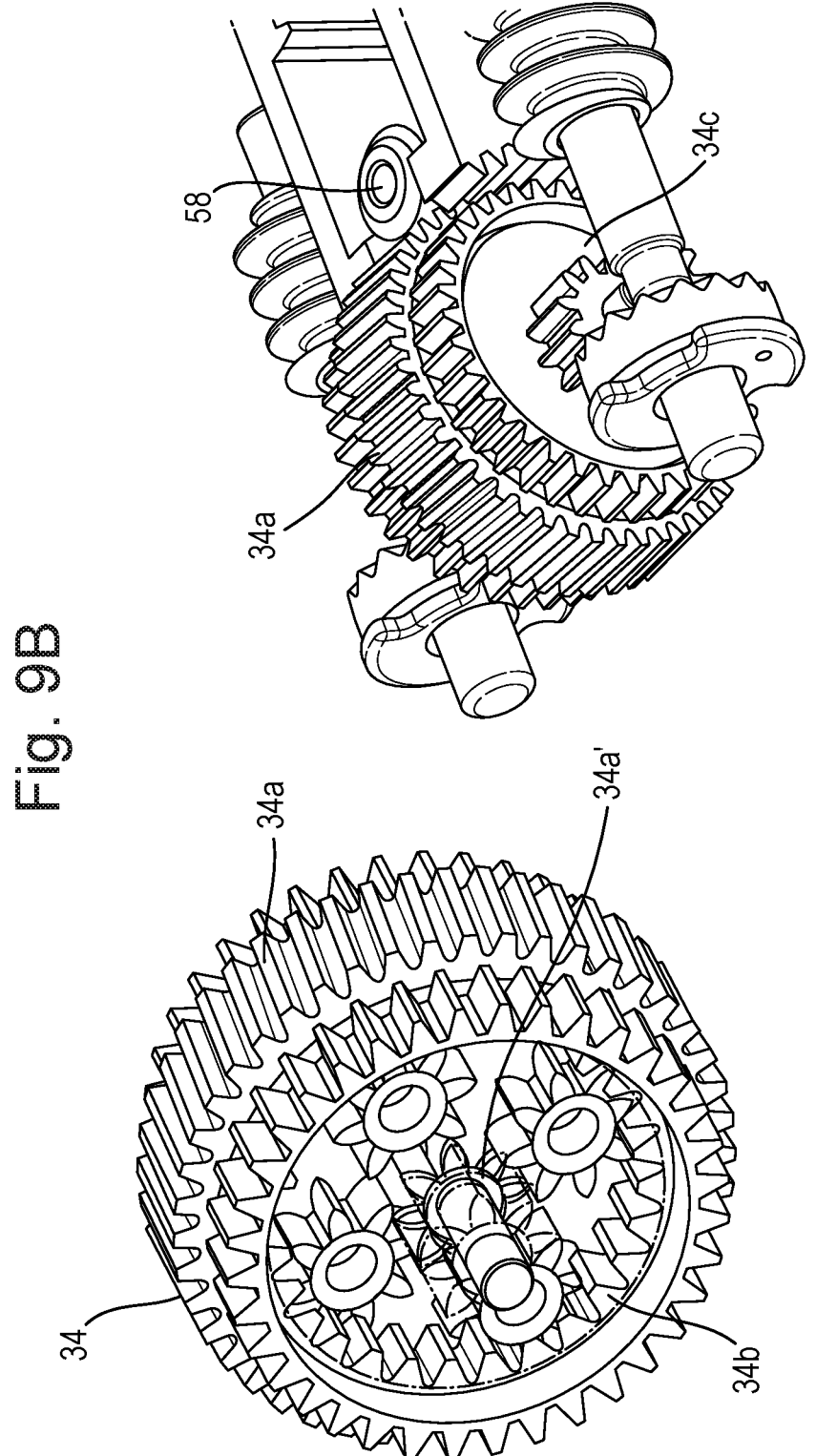
FIG. 9b shows a detail of the coupling mechanism of FIG. 9.

In a fourth embodiment, an example of which is shown in FIG. 9, the coupling mechanism 18 comprises a first and second translatable arm 30, 32. Both arms 30, 32 can be provided with a rack which engages a pinion 76 which is connected with the rotor of the second electric motor. By rotation of the pinion 76, both arms can be translated. If both arms 30, 32 engage the pinion 76 on opposite sides, upon rotation of the pinion 76 in a first direction, the first arm 30 will move towards the output element 26, while the second arm 32 moves away from the output element 26. Upon a rotation of the pinion 76 in a second direction, opposite to the first direction, the first arm 30 will move away from the output element 26, while the second arm 32 moves towards the output element 26.

The output element 26 can be an output of a compound planetary gear system 34. Per output stage, a sun wheel 34$a$ by way of a worm wheel 34$a'$, rigidly connected therewith, of the planetary gear system 34 is driven by a driving worm 58 which is connected with the rotor of the first electric motor 12. Both translatable arms 30, 32 may be provided at an end with toothing which is configured to engage a gearwheel on one of the output shafts of the planetary gear system 34. Both arms 30, 32 have a blocking position where each of the ends provided with a toothing engages a respective set of teeth 34$b$ of the compound planetary gear system 34. This output shaft is thereby restrained from turning, which means that the other output shaft, formed by the respective planetary gear carrier 34$c$ of the planetary gear system 34, forms the output of the output element 26. Planetary gear carrier 34$c$ and output element 26$b$ are executed in one piece. This output can transmit the rotation by means of a gearwheel to the first or second element to be driven 70, 72. In the example of FIG. 9, output element 26 engages a crown gearwheel of the first or second output stage 22, 24.

Figure 10:
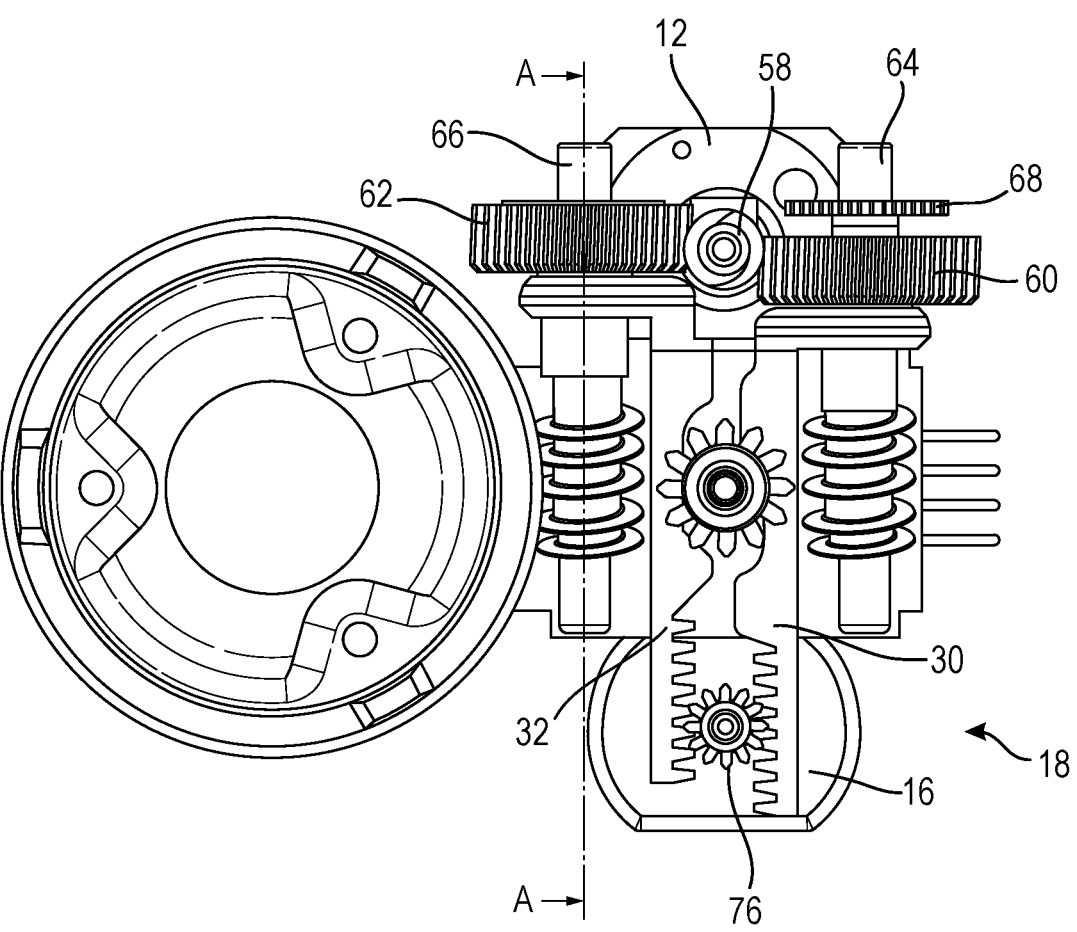
FIG. 10 shows another example of the coupling mechanism according to the description.
Figure 11:
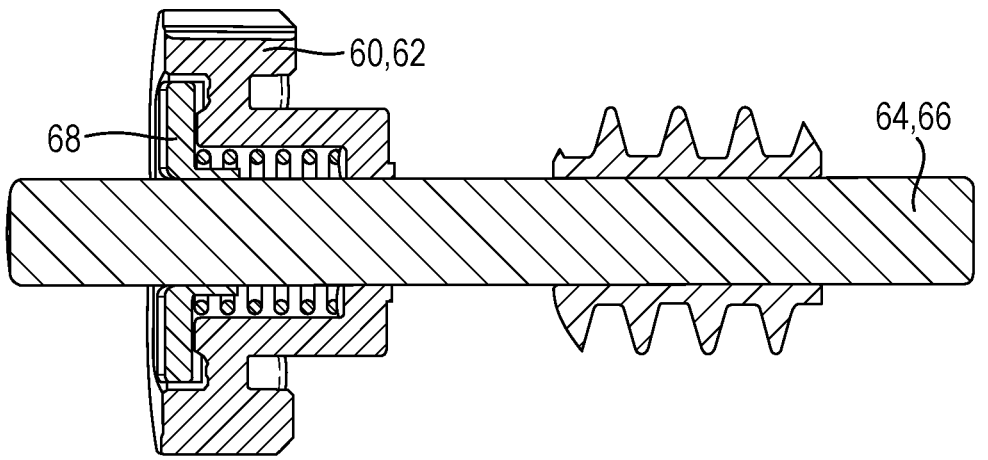
FIG. 11 shows a cross section of the shaft along line AA in FIG. 10.

A fifth embodiment, an example of which is shown in the FIGS. 10 and 11, is comparable, as regards the coupling mechanism, to the above described fourth embodiment. In this embodiment, both translatable arms 30, 32 have a driving gear 60, 62 extending transversely to the translating direction. The first driving gearwheel 60, which is connected to the first translatable arm 30, can be mounted on a shaft which has been secured to the first arm 30 with a snap fit. The second driving gearwheel 62 can be similarly connected to the second translatable arm 32. Running through the first driving gearwheel is a first driving shaft 64, and running through the second driving gearwheel 62 is a second driving shaft. By translation of the two arms 30, 32, the driving wheels 60, 62 slide over their associated driving shaft 64, 66. The first and the second driving shaft 64, 66 can comprise a coupling part, which is fixedly connected with the driving shaft 64, 66, and which can engage an inner toothing of the driving gearwheel 60, 62 associated with the driving shaft 64, 66.

The first translatable arm 30 has a coupling position, in which the first driving gearwheel 60, connected to the end of the first translatable arm 30, engages the coupling part 68 of the first driving shaft 64, whereby a rotation of the driving worm 58, via the first driving gearwheel 60 and the coupling part 68, is transmitted to the first driving shaft 64. The first translatable arm 30 has a release position, in which the first driving gearwheel 60, connected to the end of the first translatable arm 30, is free of the coupling part 68 of the first driving shaft 64, whereby a rotation of the driving worm 58 is not transmitted to the first driving shaft 64. The second translatable arm 32 also has a coupling position, in which the second driving gearwheel 62, connected to the end of the second translatable arm 32, engages the coupling part 68 of the second driving shaft 66, whereby a rotation of the driving worm 58, via the second driving gearwheel 62 and the coupling part 68, is transmitted to the second driving shaft 66. The second translatable arm 32 has a release position, in which the second driving gearwheel 62, connected to the end of the second translatable arm 32, is free of the coupling part 68 of the second driving shaft 66, whereby a rotation of the driving worm 58 is not transmitted to the second driving shaft 66. Due to the two arms 30, 32 being translated in opposite direction, only one of them can be in the coupling position at any time.

Upon a coupling of the output element 26 to the first or second element to be driven 70, 72, a force may be exerted on the relevant translatable arm 30, 32, that is opposite to the force that is exerted by the second electric motor 16. To prevent the operating force of the second electric motor 16 being thereby counteracted, or canceled, the connection between the rotor of the second electric motor 16 and the pinion 76 which engages the racks of both translatable arms 30, 32 may be provided with a pin in slotted hole connection, or a knee joint rod system. A mechanical backlash of the translatable arms 30, 32 to the second electric motor 16 is thereby prevented.

Figures 12, 13:
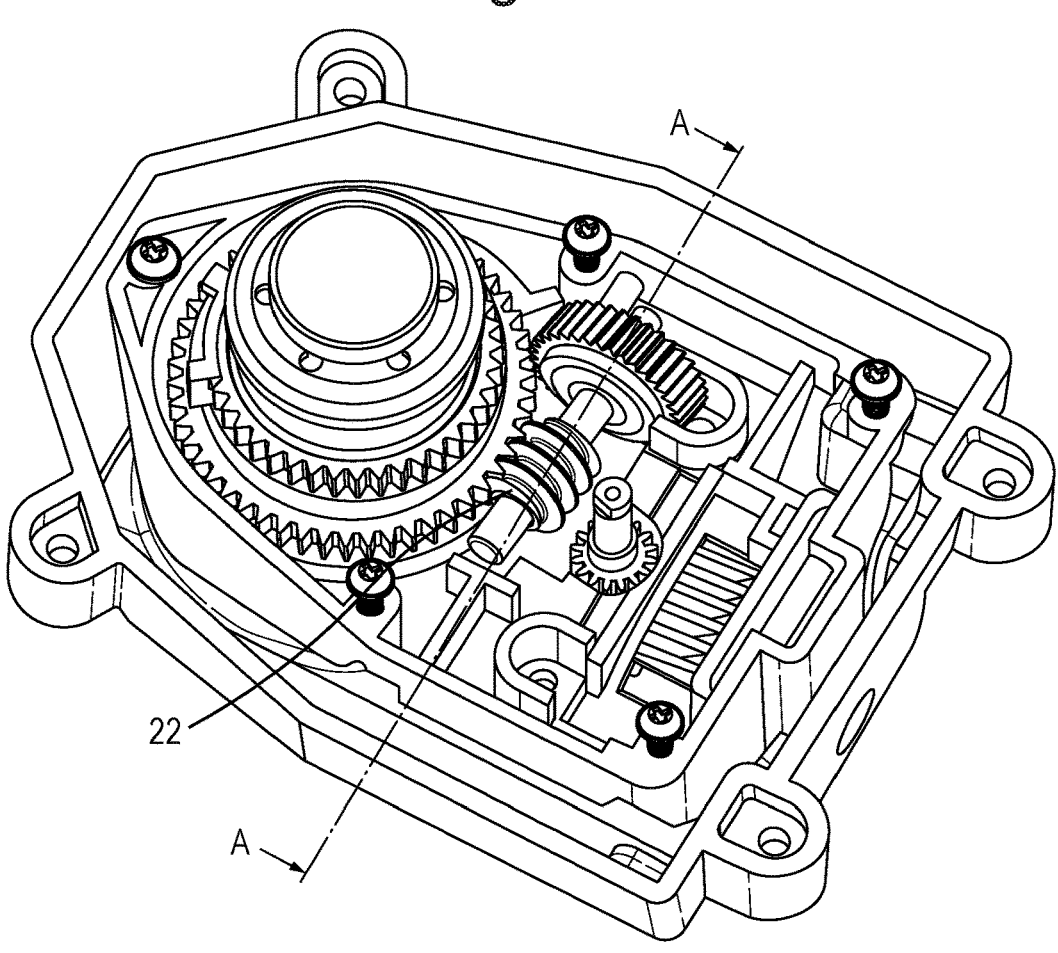
FIG. 12 an example of an output stage and an adjusting instrument according to the description.
FIG. 13 shows a cross section of the shaft along line AA in FIG. 12.

What holds for all embodiments is that the first element to be driven 70 can be part of a first output stage 22, and the second element to be driven 72 can be part of a second output stage 24. The element to be driven 70, 72 can be, as indicated in the figures, a gearwheel which engages a shaft through the first and second pivoting axis 50, 52. The elements to be driven 70, 72 can also be the elements that engage the output element 26, such as the first and second worm gearwheels 38, 40, the first and second crown gearwheels 54, 56 or the first and second driving gearwheels 60, 62 in the above described embodiments. Both output stages 22, 24 can be executed as a shaft, which is driven by the output element 26 and comprises a worm which engages a gearwheel which is connected with or is part of the associated element to be driven 70, 72. Through this transmission, a reduction of the rotation speed of the first electric motor 12 can be brought about, whereby the rotation of the first electric motor 12 results in a rotation of the first or second element to be driven 70, 72 with a lower rotation speed. An extra reduction can be obtained by adding a planet wheel to the shaft of the output stage 22, 24, an example of which is shown in the FIGS. 12 and 13. When the planet wheel is in engagement with the output element 26, the rotation of the planet wheel will be passed on, delayed, to the shaft of the output stage 22, 24.

The invention provides in addition an adjusting instrument 10 for an exterior vision element 44 for a motor vehicle. The adjusting instrument comprises a drive in one of the variants as described hereinbefore, a first output stage 22 for driving an upward and downward pivoting movement of an exterior vision element, and a second output stage 24 for driving an inward and outward pivoting movement of an exterior vision element. The effects and advantages of the adjusting instrument 10 have already been described in the summary and these effects and advantages are understood to be inserted here by reference.

In an embodiment, the adjusting element 10 may be provided with an exterior vision unit, such as a mirror glass or camera, coupled to the first and/or second element to be driven 70, 72. The exterior vision unit may then be coupled to the output stages directly, but also indirectly, for instance via a carrier 46. The exterior vision unit and/or the carrier 46 may then be hingedly connected via a hinge mechanism with a base 74 to be mounted on for instance the door of the motor vehicle, and be adjustable relative to the base 74 under the influence of the adjusting drive.

It will be clear that each of the devices shown and described and each element of the devices shown and described are also understood to have been described and shown separately. It will also be clear that the devices and the elements can also be used individually and/or in combination with at least one other element described or shown.

Furthermore, it is noted that the invention is not limited to the exemplary embodiments described here. Many variants are possible.

Thus, the drive may also be used for other driving purposes than for adjusting an adjusting instrument for an exterior vision unit of a motor vehicle, for instance adjusting air guiding flaps of a motor vehicle to improve the aerodynamics.

Such variants will be clear to one skilled in the art and are understood to be within the scope of the invention, as set forth in the appended claims.

LEGEND

10—adjusting instrument
12—first electric motor
14—driving mechanism
16—second electric motor
18—coupling mechanism
20—driving stage
22—first output stage
24—second output stage
25a—first motor gearwheel
25b—output gearwheel
25c—second motor gearwheel
25d—gearwheel segment
26—output element
28—lever arm
30—first (translatable) arm
32—second (translatable) arm
34—planetary gear system
36—pivoting axis
38—first worm gear
40—second worm gear
42—eccentric wheel
44—exterior vision element
46—carrier 48—carrying frame
50—first hinging axis
52—second hinging axis
54—first crown gear
56—second crown gear
58—driving worm
60—first driving gear
62—second driving gear
64—first driving shaft
66—second driving shaft
68—coupling part
70—first element to be driven
72—second element to be driven
74—base
76—pinion

The invention claimed is:

1. A drive, for an adjusting instrument for an exterior vision element for a motor vehicle, comprising:
a driving mechanism cooperating with a first electric motor, the driving mechanism being configured for, by energization of the first electric motor, driving respectively a first and a second element to be driven,
wherein the driving mechanism comprises a coupling mechanism cooperating with a second electric motor, the coupling mechanism being configured for, by energization of the second electric motor, selectively coupling the driving mechanism with respectively the first and the second element to be driven, wherein the maximum absorbed power of the second motor is less than that of the first electric motor (12).

2. The drive according to claim 1, wherein the electric motors are low-voltage electric motors, and wherein the voltage is approximately 24V or approximately 12V.

3. The drive according to claim 1, wherein the electric supply of both the first and the second electric motor is taken care of by one electric door module of a motor vehicle.

4. The drive according to claim 1, wherein the coupling mechanism under action of the second electric motor is adjustable between a first condition in which the first motor is coupled with the first element to be driven, and a second condition in which the first motor is coupled with the second element to be driven.

5. The drive according to claim 4, wherein the coupling mechanism under action of the second electric motor is adjustable into a neutral condition, in which the coupling mechanism leaves free both the first and the second element to be driven.

6. The drive according to claim 1, wherein the coupling mechanism is configured to counteract driving of the second motor by the first motor.

7. The drive according to claim 1, wherein the driving mechanism comprises a driving stage cooperating with the first electric motor, which driving stage cooperates with a first output stage which the first element to be driven is part of, and with a second output stage which the second element to be driven is part of.

8. The drive according to claim 7, wherein the driving stage comprises an output element, and wherein the output element under action of the second electric motor with the aid of the coupling mechanism is adjustable between a first position, corresponding to the first condition of the coupling mechanism, in which the output element of the driving stage cooperates with the first output stage, and a second position, corresponding to the second condition of the coupling mechanism, in which the output element of the driving stage cooperates with the second output stage.

9. The drive according to claim 8, wherein the output element under action of the second electric motor with the aid of the coupling mechanism is adjustable into a neutral position, corresponding to the neutral condition of the coupling mechanism, in which the output element leaves free both the first and the second element to be driven, and in particular leaves free both the first and the second output stage.

10. The drive according to claim 1, wherein the coupling mechanism comprises a pivotably disposed lever arm which is pivoted by the second electric motor, and which comprises at one end an output element of a driving stage.

11. The drive according to claim 8, wherein the driving output element and the element to be driven comprises a cooperating gearwheel pair, a worm wheel/worm gearwheel pair or a gearwheel/crown wheel pair.

12. The drive according to claim 1, wherein the coupling mechanism comprises a translatably disposed arm, in particular two arms disposed movably relative to each other in opposite direction.

13. The drive according to claim 8, wherein the driving output element comprises an output of a planetary gear system.

14. An adjusting instrument for an exterior vision element for a motor vehicle, comprising a drive according to claim 1, and a first output stage for driving an upward and downward pivoting movement of an exterior vision element, and a second output stage for driving an inward and outward pivoting movement of an exterior vision element.

15. The adjusting instrument according to claim 14, furthermore comprising an exterior vision unit coupled with the first and/or second element to be driven.

16. The drive according to claim 12, wherein the driving output element comprises an output of a planetary gear system.

17. The adjusting instrument for an exterior vision element for a motor vehicle, comprising a drive according to claim 5, and a first output stage for driving an upward and downward pivoting movement of an exterior vision element, and a second output stage for driving an inward and outward pivoting movement of an exterior vision element, wherein the first and/or second output stage in a neutral condition of the coupling mechanism is not self-braking.

* * * * *